(12) United States Patent
Hoxsey

(10) Patent No.: US 9,227,233 B2
(45) Date of Patent: Jan. 5, 2016

(54) MINERAL-RELEASING COMPOST AND METHOD OF USING THE SAME FOR SOIL REMEDIATION

(76) Inventor: Jane A. Hoxsey, Wenatchee, WA (US)

( * ) Notice: Subject to any disclaimer, the term of this patent is extended or adjusted under 35 U.S.C. 154(b) by 59 days.

(21) Appl. No.: 13/817,128

(22) PCT Filed: Aug. 16, 2011

(86) PCT No.: PCT/US2011/047982
§ 371 (c)(1),
(2), (4) Date: May 23, 2013

(87) PCT Pub. No.: WO2012/024334
PCT Pub. Date: Feb. 23, 2012

(65) Prior Publication Data
US 2013/0233036 A1 Sep. 12, 2013

Related U.S. Application Data

(60) Provisional application No. 61/374,957, filed on Aug. 18, 2010.

(51) Int. Cl.
| | | |
|---|---|---|
| B09C 1/00 | (2006.01) | |
| B09C 1/08 | (2006.01) | |
| B09C 1/10 | (2006.01) | |
| C05F 17/00 | (2006.01) | |
| C02F 1/58 | (2006.01) | |

(52) U.S. Cl.
CPC ... *B09C 1/08* (2013.01); *B09C 1/10* (2013.01); *C02F 1/58* (2013.01); *C05F 17/009* (2013.01); *C05F 17/0036* (2013.01); *C05F 17/0045* (2013.01); *Y02W 30/43* (2013.01)

(58) Field of Classification Search
CPC ............. B09C 1/00; B09C 1/08; C02F 1/58; C02F 17/0036; C02F 17/0045; C02F 17/009; Y02W 30/43
USPC ........................................................ 71/11–26
See application file for complete search history.

(56) References Cited

U.S. PATENT DOCUMENTS

| | | | |
|---|---|---|---|
| 6,025,187 A * | 2/2000 | Penaud ...................... | 435/262.5 |
| 6,811,786 B1 * | 11/2004 | Farmer et al. .............. | 424/247.1 |
| 7,662,294 B1 | 2/2010 | Cox, Jr. | |
| 2003/0113903 A1 | 6/2003 | Miyazaki | |
| 2013/0233036 A1 * | 9/2013 | Hoxsey ............... | 71/9 |

FOREIGN PATENT DOCUMENTS

| | | |
|---|---|---|
| JP | 2007-313407 A | 12/2007 |
| JP | 2009-125624 A | 6/2009 |
| WO | 01/32588 A1 | 5/2001 |

* cited by examiner

*Primary Examiner* — Jennifer A Smith
(74) *Attorney, Agent, or Firm* — Seed IP Law Group PLLC

(57) ABSTRACT

Described herein is a mineral-releasing compost prepared by combining a prebiotic material, a probiotic material, and one or more mineral gluconate salts to form a composting mixture, controlling composting conditions to allow for the composting mixture to decompose, and allowing the composting mixture to fully stabilize and mature, wherein the compost includes one or more minerals as digested products of the respective mineral gluconate salts. The mineral-releasing compost is particularly suitable for remediation of soil contaminated with heavy metals and for amendment of soil deficient of certain minerals.

8 Claims, 2 Drawing Sheets

MINERAL-RELEASING COMPOST AND METHOD OF USING THE SAME FOR SOIL REMEDIATION

CROSS-REFERENCE TO RELATED APPLICATION

This application claims the benefit of the filing date of U.S. Provisional Application 61/374,957, filed on Aug. 18, 2010, the entire contents of which is incorporated herein by reference.

BACKGROUND

1. Technical Field

This invention is related to mineral-releasing compost and methods of using the same for soil amendment or remediation, in particular, for immobilizing or removing heavy metals from soil.

2. Description of the Related Art

Heavy metal contamination of soil poses a major threat to human health and the ecosystem. Heavy metals are not only prevalent in the soil of mining and manufacturing sites; they are common in agricultural soil that has been treated with certain types of pesticides. Moreover, heavy metals are not necessarily contained within the original sites of the contaminating activities or events. Instead, they may leach into ground water or migrate to other sites through run-offs, causing wider spread pollution.

Conventional techniques for remediating heavy-metal contaminated soils include: immobilization and removal. Immobilization leaves the heavy metals in the soil but minimizes their bioavailability and migration. Immobilization can be achieved by solidification or stabilization by liming and using soil amendments, such as zeolites, cement, or biosolid (a treated byproduct of domestic and commercial sewage). Alternatively, heavy metals may be permanently removed from the contaminated soil by soil washing, which extracts soluble fractions of heavy metal from soil to water. Contaminated soil may also be excavated and transported to an off-site landfill, or disposed of by incineration.

These conventional techniques are typically costly, labor intensive, and environmentally inefficient. Thus, there is a need for an organic approach to soil remediation that has low environmental impact.

BRIEF SUMMARY

Mineral-releasing compost and method of using the same are described.

One embodiment provides compost prepared by: combining a prebiotic material, a probiotic material, and one or more mineral gluconate salts to form a composting mixture; controlling composting conditions to allow for the composting mixture to decompose; and allowing the composting mixture to fully stabilize and mature, wherein the compost includes one or more minerals as digested products of the respective mineral gluconate salts.

Various specific embodiments provide that the prebiotic material of the compost comprises one or more cellulosic materials; or that the cellulosic material may be grass clippings, leaves or straw; or that the probiotic material comprises *Lactobacillus*; or that the mineral gluconate salt may be copper gluconate, ferrous gluconate, ferric gluconate, magnesium gluconate, zinc gluconate, cobalt gluconate, or calcium gluconate, potassium gluconate; or that the mineral gluconate salt is ferrous gluconate; or that the one or more minerals are present in the compost at about 1-5% w/w.

A further embodiment provides a composting mixture comprising: a prebiotic material; a probiotic material; and one or more mineral gluconate salts.

Various specific embodiments provide that the prebiotic material of the The composting mixture comprises one or more cellulosic materials; or that the cellulosic material may be grass clippings, leaves or straw; or that the probiotic material comprises *Lactobacillus*; or that the mineral gluconate salt may be copper gluconate, ferrous gluconate, ferric gluconate, magnesium gluconate, zinc gluconate, cobalt gluconate, calcium gluconate, or potassium gluconate; or that the mineral gluconate salt is ferrous gluconate.

Yet another embodiment provides a composting process comprising: combining a prebiotic material, a probiotic material, and one or more mineral gluconate salts to form a composting mixture; incorporating the composting mixture to a compost base; controlling composting conditions to allow for the composting mixture to decompose; and allowing the composting mixture to fully stabilize and mature.

Various specific embodiments provide that the composting process may further comprise aerating the composting mixture; or that controlling the composting conditions includes controlling a temperature to be at about 110-160° F. and moisture content to be at about 50-60%; or that the prebiotic material comprises one or more cellulosic materials, or that the cellulosic material is wood chips, wood shavings, wood pellets, leaves or straw, or that the probiotic material comprises *Lactobacillus*, or that the mineral gluconate salt is copper gluconate, ferrous gluconate, ferric gluconate, magnesium gluconate, zinc gluconate, cobalt gluconate, calcium gluconate, or potassium gluconate; or that the mineral gluconate salt is ferrous gluconate, or that the compost base comprises manure.

Yet a further embodiment provides a method of treating soil containing heavy metals comprising: (a) providing soil that contains one or more soil-bound heavy metals; (b) adding to the soil iron-containing compost prepared by composting: a prebiotic material; a probiotic material; and ferrous gluconate, wherein the iron-containing compost brings the soil pH to an acidic pH of less than 5, whereby at least a portion of the soil-bound heavy metals become bioavailable.

Various specific embodiments provide that the method may further comprise washing the soil and extracting at least a portion of the bioavailable heavy metals into a liquid phase; or that the method may further comprise adding an alkaline additive to neutralize the acidic pH to a pH of more than 5, whereby at least a portion of the bioavailable heavy metals are bound to Fe(III), Fe(II) or a combination thereof, or that the alkaline additive is dolomite, sodium hydroxide, or lime. In certain embodiments, the heavy metals are lead, arsenic or a combination thereof. In other embodiment, the probiotic material comprises *Lactobacillus* and the prebiotic material comprises manure.

Yet another embodiment provides a method for amending soil comprising: applying to the soil a mineral-releasing compost prepared by composting: a prebiotic material; a probiotic material; and one or more mineral gluconate salts; and allowing the mineral-releasing compost to release respective one or more minerals corresponding to the mineral gluconate salt.

A further embodiment provides a method of treating soil and waste water of phosphorus, the method comprising:

(a) providing soil that contains one or more soil-bound phosphorus forms;

(b) adding to the soil iron-containing compost prepared by composting:

(i) a prebiotic material;
(ii) a probiotic material; and
(iii) ferrous gluconate, wherein the iron-containing compost brings the soil pH to an acidic pH of less than 5, whereby at least a portion of the soil-bound phosphorus become soluble;
(c) extracting the soluble phosphorus into solution phase to provide waste water; and
(d) allowing the waste water to filter through an alkaline material layer and an active charcoal layer.

Various specific embodiments provide that the one or more mineral gluconate salts are selected from the group consisting of copper gluconate, ferrous gluconate, ferric gluconate, magnesium gluconate, zinc gluconate, cobalt gluconate, calcium gluconate, and potassium gluconate may be used. In particular embodiments, the one or more mineral gluconate salts are selected from the group consisting of magnesium gluconate, calcium gluconate, and potassium gluconate.

BRIEF DESCRIPTION OF THE SEVERAL VIEWS OF THE DRAWING(S)

DETAILED DESCRIPTION

Figure 1:
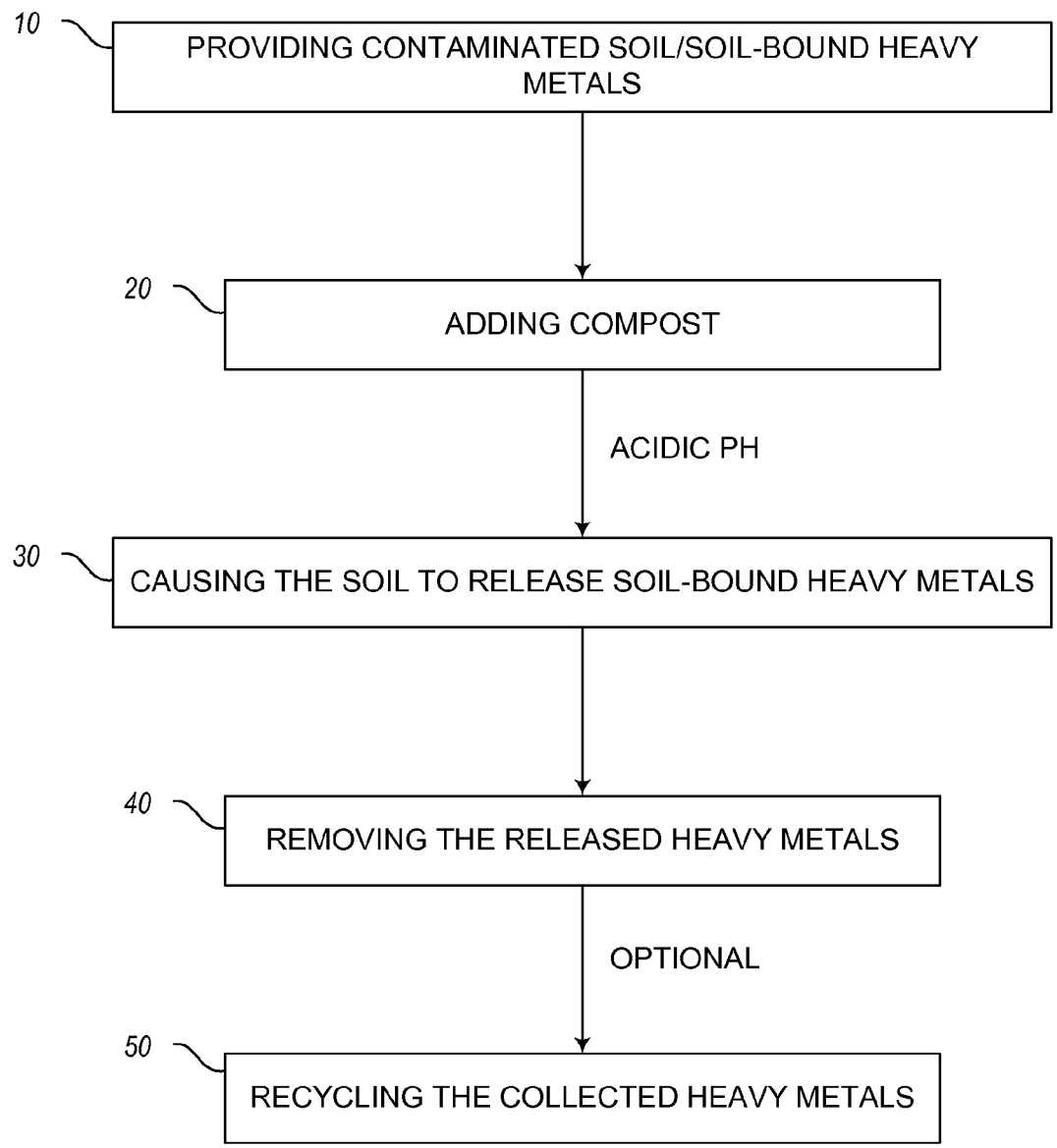
FIG. 1 is a flow chart that illustrates a method of remediating heavy metal contaminated soil according to one embodiment of the present disclosure.

Various embodiments provide compost that releases mineral in a controllable manner. In certain embodiments, the compost in accordance to the disclosure is capable of immobilizing heavy metals in soils, thereby reducing the bioavailability of the heavy metal. In other embodiments, the compost provides an efficient approach to permanently remove heavy metal from the soil. The compost is also suitable for soil amendments by adjusting soil pH and enriching soil with minerals.

Composting Mixture

Composting is a natural or controlled process of degrading organic materials. As the organic materials are fully degraded (decomposed), mature compost is formed, which is a stable and humus-rich material. Mature compost provides multiple benefits as a soil amendment by improving soil structure and nutrient-holding capacity, reducing soil compaction and crusting, and improving water infiltration and drought tolerance.

One embodiment describes a composting mixture suitable for providing mature compost that releases trace amounts of minerals in a controllable manner. As used herein, "mature compost" and "compost" are used interchangeably to refer to the end product of a composting process. The compost thus formed is a stable humus material that cannot decompose any further.

More specifically, the composting mixture comprises (1) a prebiotic material, (2) a probiotic material, and (3) one or more mineral gluconate salts. The composting mixture, when subjected to appropriate temperature, moisture and oxygen levels, decomposes into compost that can release trace amount of minerals. Advantageously, the amount and type of the mineral(s) contained in the compost formed are predetermined and controllable by controlling the type and amount of the mineral gluconate salt(s). Thus, the compost mixture can be customized to provide compost enriched with certain mineral(s).

The decomposition of the composting mixture mimics the digestion process in the small intestines of herbivores (e.g., horses) and omnivores (e.g., humans). More specifically, a prebiotic material provides an environment that selectively promotes the growth of a probiotic material such that the probiotic material dominates the natural organisms that are present during the composting process. The probiotic material digests the prebiotic material and the mineral gluconate salts. The decomposition results in compost that combines organic humus with bioavailable minerals released from the mineral gluconate salts.

These components are further described in detail herein.

1. Prebiotic Material

As used herein, a prebiotic material refers to a cellulosic material derived from plants. Due to the high content of cellulose—a complex hydrocarbon, the prebiotic material does not decompose as fast as simple organic matter (e.g., food waste). Although the prebiotic material eventually breaks down completely, its slow rate of decomposition allows it to serve as an anchor or scaffold for the growth of the probiotic material.

In certain embodiments, the prebiotic can include either carbon-rich materials or nitrogen-rich materials, or a balanced mixture of both. In general, the nitrogen-rich materials decompose faster than the carbon-rich materials. Typically, the ratio between the carbon-rich component and the nitrogen-rich component is the range of about 25:1 to 30:1.

Nitrogen-rich materials include grass clippings, food waste, green leaves, and manures (including bovine, equine, and avian matures). Preferred manures are from herbivores such as horses, sheep, goats, cows, chicken, rabbits, etc. Carbon rich materials include dried leaves, straws, saw dust, branches, wood chips, wood pellets, wood shavings, stems, bits of wood, bark dust, shredded brown paper bags, coffee filters, conifer needles, egg shells, hay, peat moss, wood ash, and mixtures thereof Preferably, the prebiotic material is grounded or shredded.

2. Mineral Gluconate Salts

As used herein, a mineral gluconate salt is an organic salt formed of a metal ion and a gluconate ion ($C_6H_{11}O_7$). Gluconate ion is the residue and anionic form of gluconic acid (shown below), which is the oxidative product of glucose:

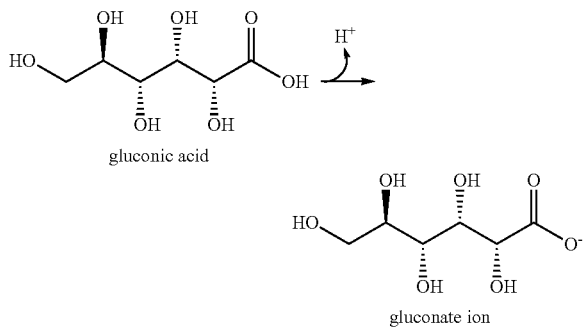

gluconic acid gluconate ion

Gluconic acid naturally occurs in fruit, honey, wine, etc. It is a powerful chelating agent and can bind to metal ions and form stable organic salts.

The metal ions are typically multivalent cations and include, for example, ferrous ($Fe^{2+}$), ferric ($Fe^{3+}$), cobalt ($Co^{2+}$), copper ($Cu^{2+}$) and the like.

In one embodiment, the mineral gluconate salt is ferrous gluconate (shown below):

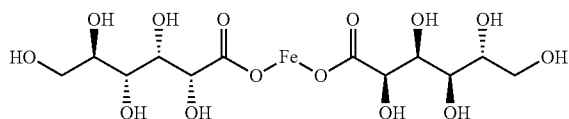

In other embodiments, the mineral gluconate salt is copper gluconate, ferric gluconate, magnesium gluconate, zinc gluconate, cobalt gluconate, calcium gluconate, potassium gluconate, and the like. These mineral gluconate salts can be obtained from, for example, PL Thomas & Co. (Morristown, N.J.).

Mineral gluconate salts can be digested by the probiotics described herein. More specifically, the gluconate ion is broken down into lactic acid, while the mineral is released in a mildly acidic medium created by the co-product, lactic acid.

Advantageously, the mineral gluconate salts can be mixed in the composting mixture in a predetermined amount to control the final metal ions to be released. In certain embodiments, a small amount of carbon-rich prebiotic material is combined with the probiotic material and the mineral gluconate salt to form an initial mixture, before the initial mixture is added to a compost base comprising additional prebiotic material, e.g., about equal amounts of carbon-rich and nitrogen-rich prebiotic material. Thus, in certain specific embodiments, the ratio of cellulosic carbon-rich pre-biotic material to mineral gluconate salt is about (by weight) 1:1, 2:1, 3:1, 4:1, or 5:1.

The amount of the mineral gluconate salt may directly correlate to the mineral released after the composting process is completed. In particular, the amount of the mineral gluconate salts can be pre-determined to arrive at a desired concentration of minerals in the final compost. In preferred embodiments, the composting mixture comprises (by weight): 50-75 parts of prebiotic material, 0.5-5 parts of probiotic material and 25-45 parts of mineral gluconate salts. In other embodiments, composting mixture comprises (by weight): 0.5-5 parts of prebiotic material, 60-80 parts of probiotic material and 20-60 parts of mineral gluconate salts.

3. Probiotic Material

As used herein, a probiotic material includes one or more microorganisms ("microbes") that break down the prebiotic materials and digest the mineral gluconate salt.

In certain embodiments, the probiotic material comprises native bacteria in the prebiotic material, such as manure. More specifically, bacteria that inhabit the animal's guts are also abundant in the animal waste.

In other embodiments, the probiotic material comprises *Lactobacillus*, which is a genus of facultative anaerobic bacteria that are major parts of the lactic acid bacteria group. *Lactobacillus* are capable of undergoing aerobic respiration if oxygen is present.

The species of *Lactobacillus* can be divided into three groups:

Group I: obligately homofermentative, which includes *L. acidophilus, L. delbrueckii, L. helveticus, L. salivarius;*

Group II: facultatively heterofermentative, which includes *L. casei, L. curvatus, L. plantarum, L. sakei*; and Group III: obligately heterofermentative, which includes *L. brevis, L. buchneri, L. fermentum, L. reuteri.*

Thus, the probiotic material can include one or more *Lactobacillus* species. Typically, members of *Lactobacillus* (or lactobacilli) are capable of converting lactose and other simple sugars to lactic acid. The presence of lactic acid can inhibit the growth of certain other bacteria, thereby allowing lactobacilli to be predominant among the organisms that degrade the composting mixture. Thus, although composting can be carried out in the presence of native bacteria alone, adding *Lactobacillus* ensures the outcome of the composting and provides reproducible results with regard to the mineral content in the mature compost. Typically, if *Lactobacillus* is added, the mineral content in the compost directly correlates to the amount of the mineral gluconate salts in the original composting mixture.

Composting Process

The composting process is a process in which the composting mixture degrades until it becomes a mature compost, as defined here. The process involves a complex feeding pattern by hundreds of different living organisms, including both microorganisms (or "microbes") and macroorganisms. Microorganisms such as bacteria, fungi and actinomycetes account for most of the decomposition by chemically breaking down the organic material in the composting mixture. Macroorganisms are larger organisms including insects, worms, centipedes, spiders, and the like. Their activities during the compositing process, such as digging, chewing and mixing, physically break down the organic material.

At the end of the compositing process, mature compost is formed. Mature compost of the present disclosure is a complex organic material that can release plant nutrients as well as minerals in a controllable manner.

Thus, another embodiment provides compost prepared by: providing a composting mixture including a prebiotic material, a probiotic material and a mineral gluocate salt; controlling composting conditions to cause the composting mixture to decompose in the presence of air; and allowing the compositing mixture to fully stabilize and mature.

In a more specific embodiment, the step of providing a compositing mixture comprises mixing a small amount of a carbon-rich prebiotic material with a mineral gluconate salt to form a first mixture; adding a probiotic material to the first mixture to form a second mixture; adding the second mixture to a compost base.

The prebiotic compost base typically includes carbon-rich prebiotic materials and/or nitrogen-rich prebiotic material. In various embodiments, at least 30%, 50%, 60% or 70% of the compost base comprises nitrogen-rich prebiotics, such as manure or grass clippings. In various embodiments, the compost base may be pure manure (nitrogen-rich), or manure with a carbon-rich prebiotic material in a 5:1, 4:1, 3:1, 2:1, 1:1, 1:2, 1:3, 1:4, 1:5 mixture. In a preferred embodiment, horse manure is used. The amount of the compost base may vary, and should be at least ⅓, or ½ or in about equal amount to the mixture of the carbon-rich prebiotic material, the mineral gluconate salt and the probiotic material.

In a specific embodiment, wood pellets (carbon rich cellulose) and mineral gluconate salt (e.g., Fe(II) gluconate) can be first combined before a pro-biotic material (e.g., *Lactobacillus*) is added. The resulting mixture is added to a compost base of 1000 grams of horse mature, or a mixture of 250 grams of horse manure and 750 grams of wood shavings.

Typically, the compositing mixture may be moistened until it is damp to the touch, e.g., squeezing the moistened second mixture should express a few drops of water. The composting mixture is then blended and placed in an aerated compost pile. The aeration ensures an environment for the initial growth of Lactobacillus.

Proper composting conditions include temperatures between about 110-160° F., moisture content between about 50-60%, and adequate oxygen for the microbes.

The decomposition produces heat, which in turn fuels further decomposition. The proper temperature allows for maximum microbial activity. The temperature can be adjusted by adjusting the various components of the composting mixture, particular with respect to the prebiotic material. For example, if the temperature is too high, a carbon-rich ingredient (e.g., dried leaves, straws) can be added. If, on the other hand, the temperature is not high enough, more of a nitrogen-rich ingredient (e.g., fresh grass clippings, food waste) can be added.

In certain embodiments, the composting process further comprises aerating the composting mixture. Aeration supplies oxygen to the composting mixture. In the presence of sufficient oxygen, aerobic microorganisms rapidly decompose the organic matter in the composting mixture. Sufficient oxygen also suppresses anaerobic actions, which are slow and tend to produce an odor. The probiotic material *Lactobacillus*, although anaerobic, is tolerant of oxygen.

Any means of aeration can be used. For example, a pump can be adapted to a composting vessel to provide a steady supply of air. The compost mixture can also be mechanically or manually turned to allow circulation of air. These techniques are known to a skilled person in the art.

The composting can be carried out in a self-standing heap or in a container or vessel. For a large in-vessel system, a pump may be necessary to supply oxygen.

The composting process is complete when the temperature declines and remains below approximately 105° F. It typically takes about 3-5 weeks, or 4 weeks, for the composting process to compete under the proper composting conditions (e.g., with aeration). Subsequently, the compost can be allowed to cure for a period of an additional 4 weeks to fully mature such that the compost will not overheat or produce odor during storage.

Mineral-Releasing Compost

In certain embodiments, mineral releasing compost is prepared that provides a controllable amounts of mineral (e.g., iron) as digested products of the mineral gluconate salt in the compositing mixture. In particular, the amount of mineral in the mature compost is determined by the initial amount of the mineral gluconate salt in the composting mixture. Further, depending on the environment in which it is released, the rate of release may also be controllable. In various embodiments, the mineral content is about 1-5% of the compost. In a preferred embodiment, the mineral content is about 2-3% of the compost.

As used herein, "mineral," "released mineral" or "mineral ions" refer, interchangeably, to the metal released from the mineral gluconate salt following the compositing process. The mineral may be in a variety of chemical forms, for instance, as an oxide, a (hydr)oxide, an oxyhydroxide, or a chelate with other materials in the compost. Certain spectroscopy techniques, such as Mossbauer spectroscopy, may be used to ascertain the chemical forms of the mineral present in the compost.

Without wishing to be bound to theory, it is believed that the mineral in the compost is in at least one or more of the following forms at a given time. First, the mineral may form complexes with humic materials in the compost. Humic materials, including humic acid and folvic acid, are a collection of complex organic constituents in soil and compost. Although their exact chemical structures vary, humic materials are typically rich in chemical moieties such as phenolic acid and carboxylic acids, which can form complexes with metal (such as iron). Second, the mineral may precipitate as a (hydr)oxide, which refers to a complex of a metal oxide and hydroxide. Third, the mineral may remain in the form of gluconate salt, which continues to be digested and provides a slow-release profile of the mineral.

Due to the complexity of the possible chemical forms, the released mineral is typically depicted in a simplified form that includes only the corresponding metal of the original mineral gluconate salt and its appropriate valence. For example, a compositing mixture containing ferrous gluconate may provide mature compost that releases Fe(II). Fe(II) illustrates that iron is present in any possible chemical forms, including, but not limited to, ferrous oxide (FeO), ferrous hydroxide ($Fe(OH)_2$), chelates, and coordination complexes, as well as ferrous cation ($Fe^{2+}$).

In other embodiments, under certain soil conditions (near neutral or alkaline pH), the initially released mineral ions may be further oxidized, as oxygen is present during the compositing process. In the case of iron, it is possible that the ferrous cation that is initially released from ferrous gluconate is oxidized into poorly soluble hydroxide or oxide of ferric cation ($Fe^{3+}$). Thus, the compost may overtime contains Fe(III) as well as Fe(II).

Soil Remediation—Heavy Metal Treatment

Soil is a major reservoir for heavy metal contaminants. The heavy metals may be present in various forms and bound to soil particles by different forces. Typically, for a given soil-bound heavy metal, there exist two main possible distributions of the heavy metal. One includes water soluble, exchangeable and adsorbed fractions, which are readily available to plants. The other one includes metal fractions that are strongly bound to soil, typically through chemical bonding with soil constituents such as humic acid and folvic acid. Because heavy metal bioavailability determines the overall physiological and toxic effects on biological system (e.g., through plant up-take), bioavailability can be a more important indicator of soil toxicity than the total metal concentration in the soil. It is also important to note that heavy metal binding to the soil particles is generally an equilibrium, which is subject to change, making it possible for even the strongly bound heavy metal to leach.

Soil toxicity is also directly linked to the species of the heavy metal. Soil contaminated with highly toxic lead (Pb) and arsenic (As) can pose a particularly grave threat to the biological system, as they are taken up by the plant roots, ingested or otherwise assimilated to organisms.

In a particular embodiment, iron-containing compost prepared by the method described herein is effective in releasing soil-bound heavy metals (e.g., lead and arsenic), which can be subsequently removed or converted to less bioavailable forms.

FIG. 1 shows a flow chart of a method of remediating heavy metal contaminated soil by treating the contaminated soil with the iron-containing compost described herein. More specifically, the iron-containing compost is prepared by composting a mixture comprising a prebiotic, ferrous gluconate and a probiotics, as described herein. Both Fe(II) and Fe(III) minerals are present in the compost, which is magnetic. In addition, lactic acid is present as a digestion by-product of the gluconate.

Referring to FIG. 1, the method comprises (a) providing soil that contains one or more soil-bound heavy metals (block 10); (b) adding an iron-containing compost as described herein (block 20), the soil and compost mixture being of an acidic pH due to the presence of lactic acid, (c) causing the release of soil-bound heavy metal to provide released heavy metals (block 30), (d) removing the released heavy metals (block 40) by washing the soil and compost mix and extracting the released heavy metal into a liquid phase (block 50). Optionally, the heavy metal in the liquid phase can be collected and recycled.

The release of the soil-bound heavy metal can be measured by the concentration differentiation of the "plant available" heavy metal before and after the compost treatment. As used herein, a "plant available" or "bioavailable" concentration of a given metal is determined by a gentle extraction method that mimics the metal up-take by the plant root systems (e.g., Example 2). For example, a solution of ammonia bicarbonate may be used to extract lead and arsenic from the contaminated soil (or treated soil) to determine the concentrations of plant available lead and arsenic. In addition, while lead is not soluble in water in any appreciable amount; arsenic is mildly soluble in water (e.g., in ground water or rain water). Thus, the water-extractable fraction of arsenic is likely to be a part of the plant available fraction.

The release of heavy metal can be typically controlled by soil pH, which in turn is controllable by the relative amount of iron-containing compost and the soil. In various embodiments, the soil pH is between about 2 to 5. In particular, the soil pH is within the range of about 2 to 3, about 2.5 to 3, about 3 to 3.5, about 3.5 to 4, about 4 to 4.5, or about 4.5 to 5. In other embodiments, the soil and compost are at a ratio (w/w) of 10:1, 9:1, 8:1, 7:1, 6:1, 5:1, 4:1, 3:1, 2:1, 1:1 or 0.5 to 1.

Figure 2:
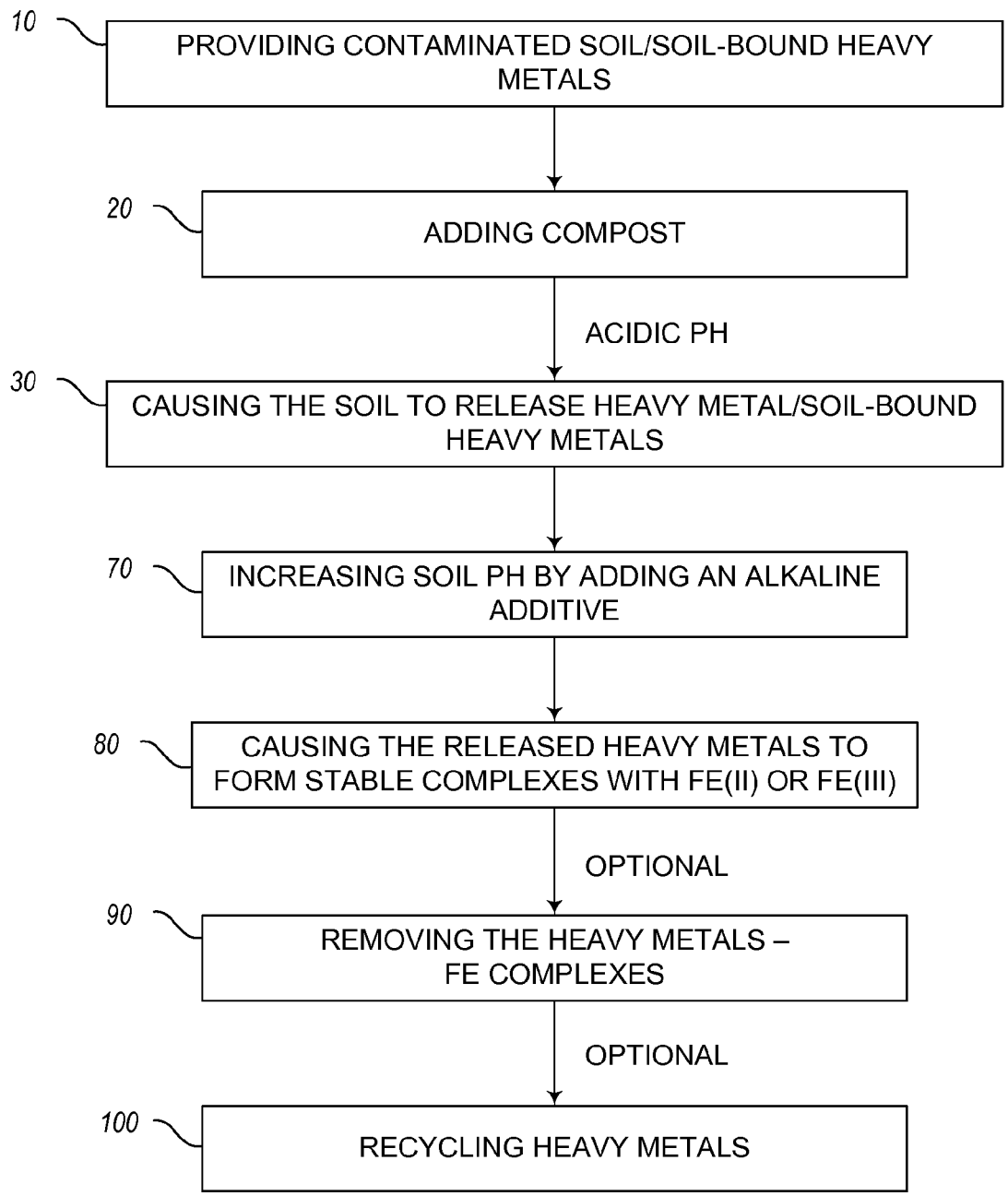
FIG. 2 is a flow chart illustrates a method of remediating heavy metal contaminated soil according to another embodiment of the present disclosure

A further embodiment provides a method of remediating heavy metal contaminated soil whereby the released heavy metals are subsequently sequestered by the iron of the iron-containing compost. Referring to FIG. 2, the method provides (a) providing soil that contains one or more soil-bound heavy metals (block 10); (b) adding an iron-containing compost as described herein (block 20), the soil and compost mixture being of an acidic pH due to the presence of lactic acid, (c) causing the release of soil-bound heavy metal to provide released heavy metals (block 30), (d) increasing the soil pH by adding an alkaline additive (block 70), and (e) causing the released heavy metal to form stable complexes with Fe(II) or Fe(III) of the compost (block 80). Optionally, the heavy metal and iron complexes may be removed by, for example, magnetic force (block 90). Further, the removed heavy metal may be recycled or otherwise disposed of (block 100).

In this embodiment, the released heavy metals are sequestered and converted to a less bioavailable form. Without wishing to be bound to theory, it is believe that, when the soil pH is increased from acidic to nearly neutral or alkaline, at least some of the iron mineral in the compost is converted to poorly soluble ferric oxide or ferric (hydr)oxide. The Fe(III) mineral precipitates are typically poorly crystalline and likely to adsorb a large quantity of heavy metal and form a stable complex that is less plant available than soil-bound heavy metal.

Suitable alkaline additive can be any inorganic substance or mineral that can neutralize the acidity of the compost. For example, lime (calcium oxide), sodium hydroxide, or carbonate minerals such as dolomite (calcium magnesium carbonate) may be used. Care should be taken to control the amount of the alkaline additive to neutralize the acidity without making the soil alkaline (e.g., pH>7). Typically, upon treatment of the alkaline additive, the pH should be raised to about 5 to 5.5, more typically to 5.5 to 6, more typically, to 6 to 6.5, or more typically, to 6.5 to 7. It is noted that the neutralization may take up to several weeks, during which time the soil pH gradually reaches to a final stabilized value (e.g., about 6.5-7).

Optionally, the heavy metal and Fe(III) complex can be removed by applying a magnetic force. Once separated from the soil, the heavy metal can be reversibly extracted from the complex by reducing the pH to an acidic level. Further, the extracted heavy metal may be recycled.

Phosphorus Removal

Phosphorus in soil can take various forms, including organic (e.g., in animal manure), inorganic soluble (e.g., plant available phosphate in fertilizer); and inorganic insoluble (e.g., phosphate bound to soil minerals). Unless specified otherwise, "phosphorus" refers to any of these available forms. Although phosphorus in soil is not significantly mobile, the soluble form can be lost to surface water such as flash rain water or leach into groundwater. Soluble phosphorus that travels into a lake can enrich the lake and lead to growth of algae and weeds (a process called eutrophication). Such process can deprive the lake of oxygen and negatively impact aquatic lives.

Similarly to heavy metal removal, the mineral-releasing compost of the present disclosure can assist the release of soil-bound phosphorus into a solution phase, and sequestering the soluble phosphorus at a neutral pH. More specifically, one embodiment of the present disclosure provides a method of treating soil and waste water of phosphorus, the method comprising:

(a) providing soil that contains one or more soil-bound phosphorus forms;

(b) adding to the soil iron-containing compost prepared by composting:
    (i) a prebiotic material;
    (ii) a probiotic material; and
    (iii) ferrous gluconate, wherein the iron-containing compost brings the soil pH to an acidic pH of less than 5, whereby at least a portion of the soil-bound phosphorus become soluble;

(c) extracting the soluble phosphorus into solution phase to provide waste water; and (d) allowing the waste water to filter through an alkaline material layer and an active charcoal layer.

In various embodiments, the alkaline material layer comprises dolomite, sodium hydroxide, lime, or a mixture thereof.

Upon neutralization, the soluble phosphorus forms a stable complex with the iron species of the compost (also in the solution phase). The resulting stable complex is likely in particulate form and is further bound to the active charcoal layer owing to its large surface areas and porous structure.

As shown in Example 6, phosphorus in the waste water (akin to run-offs) of the phosphorus-containing soil was largely removed after filtration.

Soil Amendments—pH Adjustment and Mineral-Enrichment

When used alone or in combination with conventional compost, the compost described herein further bolsters soil amendments by releasing controllable amounts of mineral ions. Mineral enrichment can be particularly beneficial by infusing minerals that are typically deficient in natural soil. In particular, calcium, magnesium and potassium are typically deficient in native soil but are proved to be essential in the growth of certain crops. For example, sufficient calcium level is vital for tomatoes to flourish, yet there is currently no effective and organic approach to supplying native soil with calcium.

Thus, in certain embodiments, the compost of the present disclosure can be used to amend soil by releasing certain minerals to the soil in a controllable manner. Typically, the mineral-releasing compost is mixed with the soil to be amended. Advantageously, the mineral-releasing compost can be customized and be enriched with specific mineral(s) to correct certain mineral deficiencies in the soil. In one embodiment, the mineral-releasing compost is enriched with iron. In particular, the iron content is about 1-5% of the compost. In a preferred embodiment, the iron content is about 2-3% of the compost. In another embodiment, the mineral-releasing compost is enriched with calcium. In particular, the calcium content is about 1%, 1.5%, 2% (about 27.7 lb/cubic yard) of the compost.

In other embodiments, the mineral-releasing compost can be used to mulch or "top dress" a planted area. The mineral-releasing compost can be used alone or mixed with conventional organic mulch (e.g., barks, woodchips) and laid on top of the soil. It helps to retain moisture, prevent erosion and release minerals in bioavailable forms.

In further embodiments, the mineral-releasing compost can be used in potting or starting mixes. Typically, the mineral-releasing compost is no more than ⅓ of the volume of the potting mix.

In other embodiments, the mineral-releasing compost can be used to adjust or balance soil pH. More specifically, the compost described herein ranges from slightly acidic to highly acidic due to the presence of lactic acid and depending on the amount of the compost added. Accordingly, when used as an amendment, such compost may be used to neutralize alkaline soil to a balanced soil pH, or be used to acidify soil to cultivate crops or plants that flourish in acidic soil. For example, most of all fruit trees prefer acidic soil. Some (e.g., blueberries) even require highly acidic soil condition (pH 4-5) to grow.

The following examples are for illustrative purposes only and are not meant to limit the scope of the invention.

EXAMPLES

Example 1

Preparation of Mineral Containing Composts

The following compost samples were made as detailed below. A no-turn, aerated compost system that contains a compost base of equal parts of wood shavings and horse manures was used in all the samples. The composting process took about 4 weeks to complete, during which the temperature was maintained at about 110-160° F., and the moisture content was maintained at about 50-60%. The composting was considered completed when the temperature dropped below about 105° F.

Compost A: An initial mixture of 1000 grams of wood pellet (a carbon-rich prebiotic) and 900 grams of ferrous gluconate was prepared. About 8 grams (one tablespoon) of *Lactobacillus* was then added to the initial mixture. The resulting mixture was then moistened until it was damp to the touch. A ball of the mixture should express a few drops of water when squeezed. Then the compositing mixture was placed in a container permeable to moisture and microbes (e.g., a panty hose) and buried in an aerated compost bin that contains a compost base of equal parts of wood shavings and horse manure. A skilled person would appreciate that the compost base may also contain zero to up to 80% of wood shavings or other cellulosic material, while the remainder of the compost base is manure.

Two control samples (Control 1 and Control 2) were prepared in a substantially similar manner as provided for Compost A.

The resulting composts were analyzed by Exova Chemical Lab (Exova, Santa Fe Springs, Calif.) or Wallace Laboratories, LLC (El Segundo, Calif.) to ascertain the iron contents in the respective compost samples. Typically, the compost sample (0.1 g) was digested with 1 ml nitric acid and 3 ml hydrochloric acid on a hot plate set at 110° C. for an hour. Thereafter, 1 ml hydrogen peroxide (30%) was added and the digestion continued for 30 minutes. Internal standard was added and the sample was dissolved to a final mass of 100 grams with nanopure water.

The components of the compost samples and the analysis are presented in Table 1.

TABLE 1

|  |  | Compost A | Control 1 | Control 2 |
|---|---|---|---|---|
| Composting Mixture | Prebiotics (gm) | 1000 | 1000 | 1000 |
|  | Probiotics (gm) | 8 | 8 | — |
|  | Ferrous gluconate (gm) | 700 | — | 700 |
| Compost analysis | pH | 3.12 | 7.07 | 3.22 |
|  | Fe content (%) | 2.2 | 0.008 | 2.5 |
|  | Magnetic property | Magnetic | Non-magnetic | Magnetic |

The composts made as described in this example exuded black water, which did not turn red (rusty) after it dried. This may suggest that the iron present in the compost prepared herein was, at least initially, Fe(II).

Thus, by controlling the amount of mineral gluconate salt in original compost mixture, the total amount of iron release is controlled. While the absence of *Lactobacillus* (control 2) did not appear to make a difference in the final iron content as compared to Compost A, it is believed that adding *Lactobacillus* can ensure that the composting process provides reproducible results, particularly with regard to the amount of iron digested and released.

Example 2

Compost Treatment of Heavy Metal Contaminated Soil

Lead and arsenic-contaminated soil was obtained from the ground of Wenatchee Valley College. Table 2 demonstrates the effects of iron-containing compost in releasing soil-bound heavy metals. All units are either mg/kg (of dry soil), which is an equivalent of parts per million (ppm), or mg/liter for saturation extract.

As shown, the untreated soil was nearly pH neutral (6.97), which was within the normal range of soil pH. The contents and fractions of lead and arsenic were measured by Wallace Laboratories, LLC (El Segundo, Calif.). The amount of total plant available arsenic was determined by a mild ammonia bicarbonate extraction, whereas the amount of water extractable arsenic was determined by water (pH neutral) extraction. Lead does not dissolve in water in any appreciative amount. However, the untreated soil contained a significant amount of plant available lead (about 60.88 ppm).

Soil Sample 1 was prepared by mixing 288 grams of soil with 124 grams of Control 1 (of Example 1), which was about 2:1 by weight ratio. As shown in Table 2, in the absence of iron, Soil Sample 1 exhibited comparable results of pH and heavy metal fractions.

Soil Sample 2 was prepared by mixing 304 grams of soil with 130 grams of Compost A (also about 2:1 by weight ratio). As shown, the soil pH dropped to acidic level (pH 3.69) on account of the lactic acid in Compost A. In addition, total plant available and water extractable arsenic rose dramatically, indicating that arsenic was released from the soil particles. Similarly, total plant available lead also rose, as did a substantial amount of aluminum. Total plant available iron was 2160 ppm.

Soil Sample 3 was prepared by mixing 230 grams of Soil Sample 2 with 144 grams of Dolomite (an alkaline additive), which brought the soil pH to nearly neutral (pH 6.11). Remarkably, the total plant available arsenic and lead both dropped dramatically, to below their respective levels in the untreated soil. Similarly, water-extractable arsenic also dropped substantially. Consistent with these results, the plant available iron also decreased substantially, indicating that iron had complexed with arsenic or lead to less bioavailable forms at higher pH.

TABLE 2

|  | pH | Arsenic (total plant available) | Arsenic (water extraction) | Lead (total Plant available) | Aluminum | Iron |
|---|---|---|---|---|---|---|
| Untreated soil | 6.97 | 2.19 | 0.21 | 60.88 | No data | No data |
| Sample 1 (Control 1) | 6.98 | 1.98 | 0.09 | 58.20 | No data | No data |
| Sample 2 (Compost A) | 3.69 | 5.54 | 3.26 | 70.54 | 535.89 | 2160.04 |
| Sample 3 (Compost A with Dolomite) | 6.11 | 1.49 | 0.03 | 29.50 | 135.74 | 1265.80 |

Table 3 demonstrates that rinsing can effectively removes heavy metal following treatment with the compost. Soil Sample 4 was prepared by mixing untreated soil and Compost A at 5:1 by weight ratio. As compared to Soil Sample 2, the soil pH is much higher due to the reduced amount of Compost A. Nevertheless, the treated Soil Sample 4 was more acidic than the untreated soil. At pH 5.29, plant available arsenic was comparable to the untreated soil, though the water extractable fraction was increased. Plant available lead only increased slightly. Once rinsed with water twice, the water extractable arsenic was largely removed, thereby reducing the total plant available arsenic. Further, mild reduction of lead and iron were observed as a result of rinsing. Table 3 therefore shows that at mildly acidic pH (5.29), release of the heavy metal from soil particles was substantially reduced as compared to that of Soil Sample 2 (pH 3.69)

TABLE 3

|  | pH | Arsenic (total plant available) | Arsenic (water extraction) | Lead (total Plant available) | Aluminum | Iron |
|---|---|---|---|---|---|---|
| Untreated Soil | 7.33 | 0.86 | 0.17 | 20.47 | No data | 19.87 |
| Soil Sample 4 | 5.29 | 0.75 | 0.45 | 28.84 | 133.93 | 1433.38 |
| Soil Sample 4 rinsed | 5.56 | 0.42 | 0.15 | 17.93 | 76.66 | 1028.65 |

Example 3

Heavy Metal Removal and Immobiliztion

Multiple soil and compost mixtures were prepared to test the reproducibility of soil remediation by treating heavy metal contaminated soil with the compost of the present disclosure. The soil samples were obtained from an abandoned orchard site that was previously exposed to lead-arsenic based pesticides.

Table 4 shows the results of three samples of soil mixtures (Mix 1-3), in which 250 grams of soil and 100 grams of Compost A were combined (at 2.5:1 ratio). At pH 4.30-4.36, plant available arsenic and lead increased as compared to the untreated soil (see, Example 2), indicating that the heavy metals were released from soil particles at acidic pH.

TABLE 4

|  | pH | Arsenic (total plant available) | Arsenic (water extraction) | Lead (total Plant available) | Aluminum | Iron |
|---|---|---|---|---|---|---|
| Mix 1 | 4.30 | 9.19 | 2.53 | 156.04 | 336.71 | 2136.01 |
| Mix 2 | 4.33 | 9.97 | 1.84 | 210.10 | 454.03 | 2445.56 |
| Mix 3 | 4.36 | 10.77 | 2.38 | 218.30 | 417.38 | 2370.16 |

Table 5 shows the effect of neutralization of soil pH following the heavy metal release. Soil mixtures (Mix 4-6) were prepared by combining 250 grams of soil and 100 grams of Compost A (similar to Mix 1-3). Thereafter, 60 ml (2 oz) of 1% NaOH and 30 grams of dolomite were added. As shown, the soil pH rose to pH >5. The plant available arsenic and lead, as well the iron contents were lower than those of Table 4, indicating that the heavy metal and the iron had formed stable, less bioavailable complexes at a higher pH.

TABLE 5

|  | pH | Arsenic (total plant available) | Arsenic (water extraction) | Lead (total Plant available) | Aluminum | Iron |
|---|---|---|---|---|---|---|
| Mix 4 | 5.42 | 6.98 | 3.24 | 197.61 | 192.61 | 1782.60 |
| Mix 5 | 5.45 | 7.15 | 3.47 | 192.10 | 208.99 | 1920.55 |
| Mix 6 | 5.38 | 7.00 | 3.88 | 212.85 | 176.19 | 1694.89 |

Table 6 demonstrates that the removal of heavy metal following the compost treatment. Soil mixtures (Mix 7-9) were prepared by combining 250 grams of soil and 50 grams of Compost A (5:1 ratio). Thereafter, the soil mixes were washed with tap water three times. Rinsing substantially reduced the amount of total plant available arsenic.

TABLE 6

|  | pH | Arsenic (total plant available) | Arsenic (water extraction) | Lead (total Plant available) | Aluminum | Iron |
|---|---|---|---|---|---|---|
| Mix 7 | 5.22 | 1.35 | 0.15 | 227.42 | 19.12 | 625.72 |
| Mix 8 | 5.12 | 1.03 | 0.16 | 194.85 | 17.45 | 619.25 |
| Mix 9 | 5.20 | 1.19 | 0.11 | 204.72 | 18.41 | 601.81 |

Table 7 further shows the combined effects of neutralization of soil pH and rinsing following the heavy metal release. Soil mixtures (Mix 10-12) were prepared by combining 250 grams of soil and 100 grams of Compost A (similar to Mix 1-3). Thereafter, the soil mixes were rinsed 3 times with tap water, followed by the treatment 60 ml (2 oz) of 1% NaOH and 30 grams of dolomite were added. As shown, the soil pH rose to pH close to 6. The plant available arsenic and lead, as well the iron contents were dramatically lower than those of Table 4, indicating that the heavy metal and the iron had formed stable, less bioavailable complexes at a higher pH.

TABLE 7

|  | pH | Arsenic (total plant available) | Arsenic (water extraction) | Lead (total Plant available) | Aluminum | Iron |
|---|---|---|---|---|---|---|
| Mix 10 | 5.96 | 0.99 | 0.15 | 183.25 | 11.39 | 494.21 |
| Mix 11 | 5.87 | 0.47 | 0.04 | 123.14 | 9.35 | 381.65 |
| Mix 12 | 5.98 | 0.57 | 0.04 | 121.00 | 8.36 | 341.42 |

Example 4

Effect of Long-Term Neutralization

Soil-Compost A mixtures (Mix 4-6) of Example 3 were tested again after two weeks, during which time the soil pH continue to rise, indicating that neutralization was on-going. The soil pH appeared to stabilize at close to pH 7 (Table 8).

Table 8 shows that as the soil was neutralized, heavy metals became bound to the iron species in the compost, e.g., Fe(II) and/or Fe(III), as evidenced by the decreased amounts of extractable arsenic and lead. Consistent with this result, the amount of extractable iron in each sample also dropped.

TABLE 8

|  | Soil 4 pH 6.78 | | Soil 5 pH 6.64 | | Soil 6 pH 6.36 | |
|---|---|---|---|---|---|---|
|  | Total | Extractable | Total | Extractable | Total | Extractable |
| As | 7.76 | 0.99 | 4.16 | 1.26 | 5.02 | 2.96 |
| Pb | 160.62 | 9.95 | 150.98 | 13.17 | 159.17 | 33.94 |
| Al | 99.40 | 27.54 | 112.27 | 36.41 | 189.51 | 106.98 |
| Fe | 1221.07 | 264.56 | 1268.16 | 360.93 | 1856.99 | 930.89 |

Example 5

Iron-Releasing Compost

Additional iron-releasing composts were prepared to test the relative amount of compost required to effectively remove heavy metals from soil.

Compost B was prepared according to the method described in Example 1. The amount of ferrous gluconate was adjusted to yield Compost B that had an Fe(II) content of 1250 ppm.

The untreated soil was obtained from an abandoned orchard site that was previously exposed to lead-arsenic based pesticides. The arsenic (As) and lead (Pb) concentrations in the untreated soil are shown in Table 9.

1000 grams of the untreated soil was then thoroughly mixed with 100 grams of Compost B and rinsed with 240 ml of water. As shown in Table 9, the As and Pb contents in soil were reduced, suggesting that the heavy metals dissociated from the soil particles and bound to the Fe(II) species in the compost. The contents of the soluble As and Pb were unchanged.

The soil/compost mix was further neutralized with lime ($CaCO_3$), at which point, even more As and Pb became unbound from the soil particles. In addition, soluble As and Pb have formed stable complexes with the Fe(II) species at a higher pH, as indicated by the dramatically reduced levels of soluble As and Pb.

Reducing the relative amount of Compost B to 12.5 g (for 1000 g of untreated soil) did not appear to affect the effectiveness of the heavy metal removal, suggesting that even a small amount of mineral-releasing compost can be effective in removing heavy metals from soil and subsequently sequestering the same (e.g., at a neutral or alkaline pH).

TABLE 9

| Soil Remediation | | Heavy Metal Contents in Soil (ppm) | | | |
|---|---|---|---|---|---|
|  |  | Arsenic | Soluble Arsenic | Lead | Soluble Lead |
| Untreated Soil (1000 g) |  | 30.66 | 0.82 | 736.94 | 1.18 |
| Treated with 100 g of Compost B | Rinse with 240 ml of water | 20.86 | 0.90 | 662.05 | 1.41 |
|  | Neutralize with lime | 15.90 | 0.37 | 456.47 | 4.86 |
| Treated with 12.5 g of Compost B | Rinse with 240 ml of water (1 cup) | 25.04 | 0.89 | 658.29 | 2.16 |
|  | Neutralize with lime | 15.51 | 0.51 | 384.34 | 5.27 |

Example 6

Phosphorus Removal

The untreated soil was obtained as described in Example 5. The phosphorus, Arsenic and lead levels were tested and shown in Table 10. 1000 g of the untreated soil was mixed thoroughly with 100 g of Compost B. 240 ml of water was used to rinse the soli/compost mixture. The rinsed water (or waste water) was akin to run-offs. The phosphorus, As and Pb levels were measured in the r. The rinsed water was then filtered sequentially through a layer of lime and a layer of active charcoal. The phosphorus level of the waste water dropped dramatically, as did the heavy metal levels.

The same test was also carried out with much less Compost B, namely, 12.5 g of Compost B for 1000 g of untreated soil. Surprisingly, when the rinsed water and the filtered water were tested for their respective phosphorus levels, the results were comparable to those of tests carried out with 100 g Compost B (see, Table 10). These results suggest that even a small amount of mineral-releasing compost can be effective in removing phosphorus from soil and subsequently sequestering the same (e.g., at a neutral or alkaline pH).

TABLE 10

|  |  | Phosphate and Heavy Metal Contents in Soil or Water (ppm) | | |
|---|---|---|---|---|
|  |  | Phosphorus | Arsenic | Lead |
| Untreated Soil (1000 g) |  | 33.37 | 30.66 | 736.94 |
| Treated with 100 g Compost B | Rinsed Water (Run-off) | 4.04 | 3.78 | 5.83 |
|  | Filtered Water | 0.86 | 1.30 | 1.18 |
| Treated with 12.5 g Compost B | Rinsed Water (Run-off) | 4.17 | 3.92 | 6.16 |
|  | Filtered Water | 0.95 | 1.84 | 1.38 |

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A composting process comprising:
   providing a composting mixture including a prebiotic material, a probiotic material having *Lactobacillus*, and one or more mineral gluconate salts, wherein the one or more mineral gluconate salts include ferrous gluconate or ferric gluconate;
   controlling composting conditions to allow for the composting mixture to decompose and release respective one or more mineral ions corresponding to the one or more mineral gluconate salts, wherein the one or more mineral ions include ferrous or ferric ions; and
   allowing the composting mixture to fully stabilize and mature.

2. The composting process of claim 1 further comprising aerating the composting mixture.

3. The composting process of claim 1 wherein controlling the composting conditions includes controlling a temperature to be at about 110-160° F. and moisture content to be at about 50-60%.

4. The composting process of claim 1 wherein the prebiotic material comprises one or more cellulosic materials.

5. The composting process of claim 4 wherein the cellulosic material is wood chips, wood shavings, wood pellets, leaves or straw.

6. The composting process of claim 1 wherein the one or more mineral gluconate salts further include copper gluconate, magnesium gluconate, zinc gluconate, cobalt gluconate, calcium gluconate, or potassium gluconate.

7. The composting process of claim 6 wherein the one or more mineral gluconate salt is ferrous gluconate.

8. The composting process of claim 1 further comprising incorporating the composting mixture to a compost base prior to compositing, and wherein the compost base comprises manure.

* * * * *